(12) United States Patent
    Chan et al.

(10) Patent No.: US 10,256,627 B2
(45) Date of Patent: *Apr. 9, 2019

(54) POWER MANAGEMENT CIRCUITRY IN PERIPHERAL ACCESSORIES OF AUDIO DEVICES

(71) Applicant: BBPOS LIMITED, Hong Kong (HK)

(72) Inventors: Wing Cheong Chan, Hong Kong (HK); Hwai Sian Tsai, Hong Kong (HK); Chi Wah Lo, Hong Kong (HK)

(73) Assignee: BBPOS Limited, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 15/726,262

(22) Filed: Oct. 5, 2017

(65) Prior Publication Data

US 2018/0048147 A1    Feb. 15, 2018

Related U.S. Application Data

(63) Continuation of application No. 14/491,306, filed on Sep. 19, 2014, now Pat. No. 9,793,712, which is a
(Continued)

(51) Int. Cl.
    *G07F 7/08* (2006.01)
    *H02J 1/10* (2006.01)
    *H02J 7/00* (2006.01)

(52) U.S. Cl.
    CPC ............ *H02J 1/102* (2013.01); *G07F 7/0873* (2013.01); *H02J 7/0068* (2013.01); *Y10T 307/615* (2015.04); *Y10T 307/625* (2015.04)

(58) Field of Classification Search
    CPC ........ G07F 7/1008; G07F 7/08; G06Q 20/341
    (Continued)

(56) References Cited

U.S. PATENT DOCUMENTS 6,552,512 B1    4/2003  Harris
7,010,332 B1    3/2006  Irvin et al.
(Continued)

FOREIGN PATENT DOCUMENTS

CN    1462412 A     12/2003
CN    102223234 A   10/2011

OTHER PUBLICATIONS

English Translation of First Office Action in related Chinese Patent Application No. 2013102467409.

*Primary Examiner* — Ahshik Kim
(74) *Attorney, Agent, or Firm* — Gregory M. Howison (57) ABSTRACT

A power management circuitry for a peripheral electronic device includes a power regeneration circuitry, a power selector, a power switch and an audio signal detection circuitry. The power regeneration circuitry receives a continuous periodic sound wave from an audio device and converts the continuous periodic sound wave into an amplified DC electrical signal. The power source selector receives the amplified DC electrical signal and input from a primary power source and provides a power signal output. The audio signal detection circuitry receives the amplified DC electrical signal and transmits a wake-up signal to the power switch circuitry. The power switch circuitry is turned on by the wake-up signal and connects the power source selector to the peripheral electronic device main circuitry and transfers the power signal output to the peripheral electronic device main circuitry.

20 Claims, 9 Drawing Sheets

Related U.S. Application Data continuation of application No. 13/562,501, filed on Jul. 31, 2012, now Pat. No. 8,840,017, which is a continuation-in-part of application No. 12/767,831, filed on Apr. 27, 2010, now Pat. No. 8,336,771.

(58) Field of Classification Search
USPC .................................................. 235/380, 382
See application file for complete search history.

(56) References Cited

U.S. PATENT DOCUMENTS

| | | |
|---|---|---|
| 8,840,017 B2 | 9/2014 | Chan et al. |
| 9,793,712 B2 * | 10/2017 | Chan ..................... H02J 1/102 |
| 2003/0141989 A1 | 7/2003 | Arisawa et al. |
| 2010/0260341 A1 | 10/2010 | Sander et al. |
| 2011/0259957 A1 | 10/2011 | Tsai |
| 2013/0013095 A1 | 1/2013 | Lu et al. |
| 2014/0072144 A1 | 3/2014 | Wu |

* cited by examiner

POWER MANAGEMENT CIRCUITRY IN PERIPHERAL ACCESSORIES OF AUDIO DEVICES

CROSS-REFERENCE TO RELATED APPLICATIONS

This application is a continuation of U.S. patent application Ser. No. 14/491,306, filed on Sep. 19, 2014, entitled POWER MANAGEMENT CIRCUITRY IN PERIPHERAL ACCESSORIES OF AUDIO DEVICES, which issued on Oct. 17, 2017 as U.S. Pat. No. 9,793,712. U.S. application Ser. No. 14/491,306 is a continuation of U.S. patent application Ser. No. 13/562,501, filed Jul. 31, 2012 and entitled POWER MANAGEMENT CIRCUITRY IN PERIPHERAL ACCESSORIES OF AUDIO DEVICES, which issued on Sep. 23, 2014 as U.S. Pat. No. 8,840,017. U.S. patent application Ser. No. 13/562,501 is a continuation in part and claims the benefit of U.S. application Ser. No. 12/767,831, filed Apr. 27, 2010 and entitled DEBIT AND CREDIT CARD TRANSACTION DEVICE. U.S. patent application Ser. Nos. 14/491,306, 13/562,501 and 12/767,831, and U.S. Pat. Nos. 9,793,712 and 8,840,017 are incorporated by reference herein in their entirety.

TECHNICAL FIELD

The present invention relates to power management circuitry in peripheral accessories of audio devices, and in particular to power management circuitry that regenerates power in a peripheral accessory from an audio device.

BACKGROUND

Portable personal computing devices such as smart phones, Personal Digital Assistant (PDA), portable computers, tablet computers and audio devices such as digital music players have become ubiquitous in recent years. These devices usually have different built-in physical electrical interfaces such as USB, FireWire, RS232 serial port and audio plug, among others. In almost all of these devices, and in particular in the audio devices, the audio plug is a common interface. The audio plug of a device acts as a receptacle for an audio jack connector which is used for transmitting analog signals including audio signals. The audio plug is used to connect to headphones, speakers, microphones, and hands-free devices, among others.

In the past, many mobile phones used to have their own proprietary form of audio plugs configured to be used with cables outfitted with matching proprietary audio jacks. However, recently the functionality of mobile phones has changed so much that most mobile phones are now also digital music players, payment devices, navigation devices and cameras, among others. Additional accessory devices including headphones, printers, and card readers, among others, may be connected to the mobile phones in order listen to music, print and complete payments, among others. Therefore due to these added functionalities and the need to connect additional accessory devices to mobile phones, 2.5 mm audio plugs and/or 3.5 mm audio plugs can now be found on most middle to high-end mobile phones.

Several electronic peripheral accessories for mobile devices may use the audio plug interface as the signal interface and all these accessories have electronic circuitry that requires power to function. The electrical power may come either from the mobile device or from an internal battery placed inside the peripheral accessory. In some cases, the internal battery is not replaceable because the compartment of the accessory is glued, sealed or otherwise permanently put together and is not intended to be opened up for battery replacement. Thus, there is a need to manage the power consumption in the peripheral accessory in order to prolong the battery lifetime of the internal battery.

SUMMARY

This present invention provides a device and a method for increasing the battery lifetime of a peripheral accessory by connecting the peripheral accessory to a secondary external power source via an audio jack connector. The device includes a power management circuitry that detects the presence of an audio power source and generates an electrical signal that is used to turn on a power switch of the accessory. The device also includes a power source selector that provides power to the peripheral accessory either from the internal battery or from the secondary external power source. The circuitry also enables the internal battery to be charged by the secondary external power source.

In general, in one aspect the invention provides a power management circuitry that is used in a peripheral electronic device. The power management circuitry includes a power regeneration circuitry, a power selector, a power switch and an audio signal detection circuitry. The power regeneration circuitry is configured to receive a continuous periodic sound wave from an audio device and to convert the continuous periodic sound wave into an amplified DC electrical signal. The power source selector is configured to receive a first input comprising the amplified DC electrical signal from the power regeneration circuitry and a second input from a primary power source and to provide a power signal output. The audio signal detection circuitry is configured to receive the amplified DC electrical signal from the power regeneration circuitry and to transmit a wake-up signal to the power switch circuitry. The power switch circuitry is configured to be turned on by the wake-up signal and to connect the power source selector to the peripheral electronic device main circuitry and thereby to transfer the power signal output to the peripheral electronic device main circuitry.

Implementations of this aspect of the invention may include one or more of the following features. The power management circuitry of claim may further include an audio jack connector configured to connect the peripheral electronic device to the audio device. The audio device comprises a secondary power source and is configured to transmit the continuous periodic sound wave to the power management circuitry. The primary power source may be a battery, a capacitor, a rechargeable power source or a non-rechargeable power source. The secondary power source may be a battery, a capacitor, a solar cell, a circuitry that regenerates power from an audio signal, a thermoelectric generator, a piezoelectric element, a device that generates power from motion and vibration, a rechargeable power source or a non-rechargeable power source. The audio jack connector includes a ground (GND) contact, a microphone-in (MIC-IN) contact and one or more earphone channel contacts. The audio jack may be a 4-contact Tip-Ring-Ring-Sleeve (TRRS) connector, 3-contact Tip-Ring-Sleeve (TRS) connector, a 3.5 mm audio jack, a 6.35 mm audio jack, a 2.5 mm audio jack, RCA connector, XLR connector, a banana connector, mono or stereo versions thereof. The audio device includes an audio plug configured to receive the audio jack connector and the audio plug comprises a ground (GND) contact configured to connect to the audio jack GND contact, a microphone-in (MIC-IN) contact configured to connect to the audio jack MIC-IN contact and one or more earphone channel contacts configured to connect to the audio jack one or more earphone channel contacts, respectively. The primary power source is configured to be recharged by the secondary power source via the power regeneration circuitry. The power regeneration circuitry may be a voltage multiplier or a transformer. The power regeneration circuitry may further include a voltage stabilizer and power storage. The continuous period sound wave may be a sinusoidal in-phase sound waves played in left and right channels of the audio device, a sinusoidal out-of-phase sound waves played in left and right channels of the audio device, a square in-phase sound waves played in left and right channels of the audio device, or a square out-of-phase sound waves played in left and right channels of the audio device. The audio device may be a mobile phone, a personal digital assistant (PDA), netbook, tablet computer, notebook computer, game console, e-book reader, portable video player, or digital audio player. The peripheral electronic device may be a payment card reader, magnetic card reader, a printer, headphones, speakers, microphones, or hands-free versions thereof.

In general, in another aspect, the invention features a method for providing power management in a peripheral electronic device. The method includes providing a power regeneration circuitry configured to receive a continuous periodic sound wave from an audio device and to convert the continuous periodic sound wave into an amplified DC electrical signal. Next, providing a power source selector configured to receive a first input comprising the amplified DC electrical signal from the power regeneration circuitry and a second input from a primary power source and to provide a power signal output. Next, providing a power switch circuitry. Next, providing an audio signal detection circuitry configured to receive the amplified DC electrical signal from the power regeneration circuitry and to transmit a wake-up signal to the power switch circuitry. The power switch circuitry is configured to be turned on by the wake-up signal and to connect the power source selector to the peripheral electronic device main circuitry and thereby to transfer the power signal output to the peripheral electronic device main circuitry.

DETAILED DESCRIPTION

Several electronic peripheral accessories for mobile devices use the audio plug interface as the signal interface. All of these peripheral accessories have electronic circuitry that requires power to function. The electrical power may come either from the mobile device or from an internal battery placed inside the peripheral accessory. In some cases, the internal battery is not replaceable because the compartment of the accessory is glued, sealed or otherwise permanently put together and is not intended to be opened up for battery replacement. Thus, there is a need to prolong the battery lifetime of the internal battery in the peripheral accessory. In the present invention, this is achieved by completely cutting off the battery from the circuitry, and/or by using a secondary external power source, and/or by recharging the internal battery from an external power source.

In an electronic device that does not have a hard power switch that cuts the power circuitry off completely, the electronic circuitry is actually still working with the controller running in some low-power modes. In this invention, a passive detection circuitry is used to detect the presence of the mobile device by detecting signals from the audio jack. The internal battery is completely cut off from the main circuitry by a power switch circuitry and then it is switched on by the detection circuitry. When an audio signal is detected, electric power is regenerated from the audio signal to turn on the main circuitry including the microcontroller and the rest of the circuitry.

The invention provides a power source selector that can select power either from the internal battery or a secondary external power source. If the secondary source can provide the required power, no power will be drawn from the internal battery. The internal battery will only be used to supply the power if the secondary source does not meet the power consumption required by the peripheral accessory. The secondary power source may be any power source such as a battery, a capacitor, a solar cell, a thermoelectric generator, piezoelectric element, or a component that generates power from motion and vibration, among others. In one embodiment, the secondary source provides power regenerated from the audio signal through the audio jack. The power from the mobile device is used to power up the accessory while data can be communicated between the mobile device and the accessory at the same time.

The present invention also provides a method for recharging the internal rechargeable battery (or other rechargeable power storage element such as a capacitor) by the secondary source. In one embodiment, the power regenerated from the audio signal can be used to recharge the internal battery.

Some mobile devices do not have enough audio output to supply the required power. The presence of the internal power source and the secondary power source enable those mobile devices to work with the accessory as well. Therefore, the invention allows a peripheral accessory to be used with a much wider range of devices.

Figure 1:
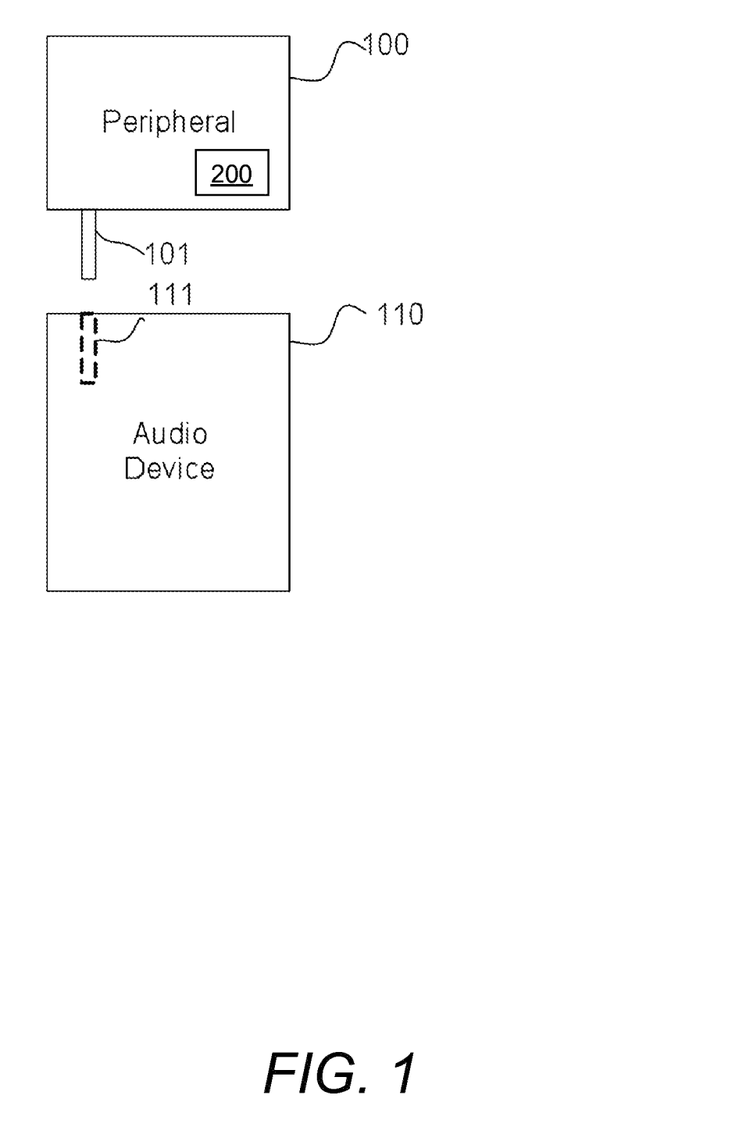
FIG. 1 is an overview diagram of a peripheral device connecting to an audio device via an audio jack.
Figure 10:
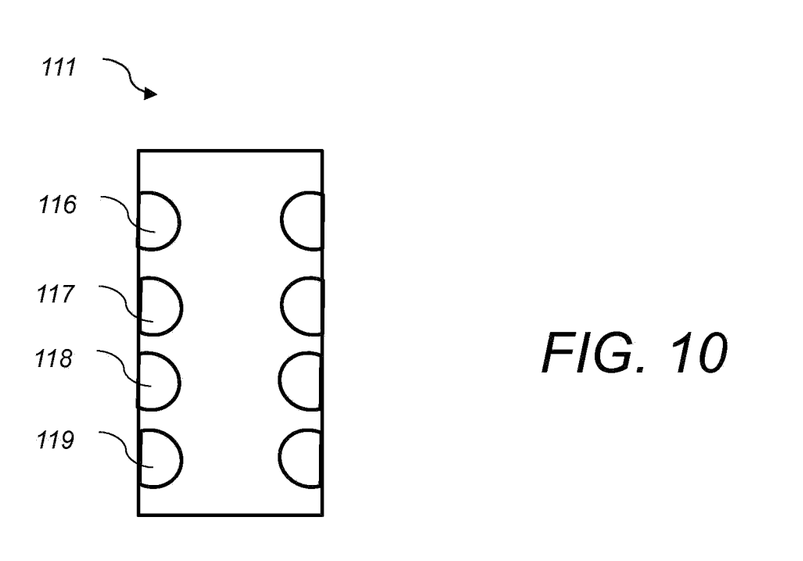
FIG. 10 depicts a schematic diagram of an audio plug of the audio device of FIG. 1.

Referring to FIG. 1, peripheral accessory device 100 includes a power management circuit 200 and an audio jack connector 101. Peripheral accessory device 100 connects to a mobile audio device 110 by inserting the audio jack connector 101 into the mobile audio device's audio plug 111. Audio plug 111 includes four contact points 116, 117, 118 and 119, shown in FIG. 10. Normally, contact points 118 and 119 are connected to the right channel (R-CH) and left channel (L-CH) of the stereo audio output of the mobile audio device, respectively. In some models of mobile audio devices, contact point 117 is connected to the ground (GND) and contact point 116 is connected to the microphone-in (MIC-IN) of the mobile audio device. In other models of the mobile audio device, contact point 117 is connected to MIC-IN and contact point 116 is connected to GND. Therefore, there are two possible arrangements of the contact points of MIC-IN and GND of the mobile audio device plug.

Figure 9:
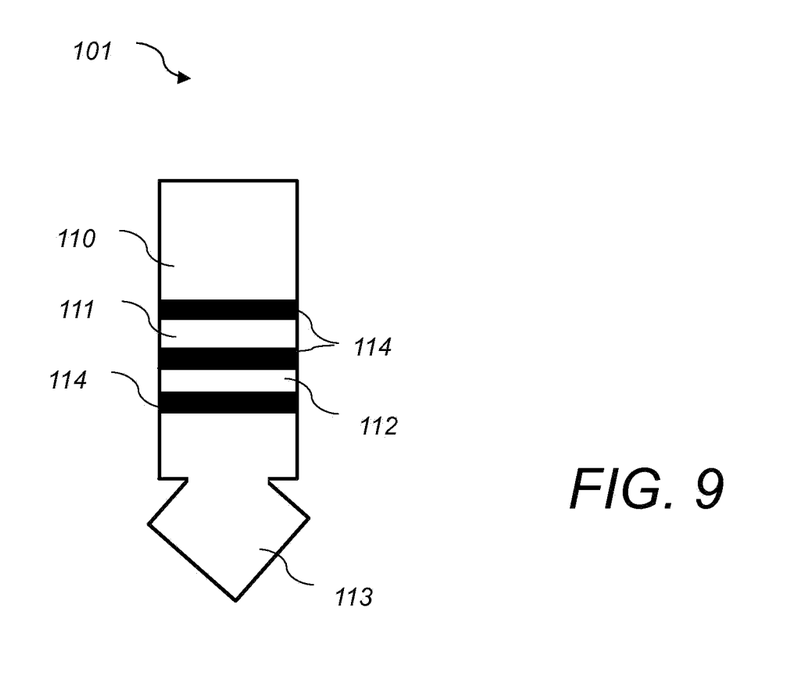
FIG. 9 depicts a schematic diagram of an audio jack of the peripheral device of FIG. 1.

In one example, audio jack connector 101 has the form of a 4-contact Tip-Ring-Ring-Sleeve (TRRS) connector, shown in FIG. 9. Audio jack 101 includes microphone-in (MIC-IN) contact 110, GND contact 111, R-CH contact 112, L-CH contact 113 and insulating rings 114. In other examples, audio jack connector 101 has the form of a 3-contact Tip-Ring-Sleeve (TRS) connector used with monaural audio devices. The 3.5 mm audio jack is used for illustration purposes only. In other examples, audio jack connectors are TRS connector 6.35 mm (quarter inch) jacks, 2.5 mm (subminiature) jacks, both mono and stereo versions of the above mentioned jacks, RCA connectors, XLR connectors, or banana connectors, among others.

Figure 3:
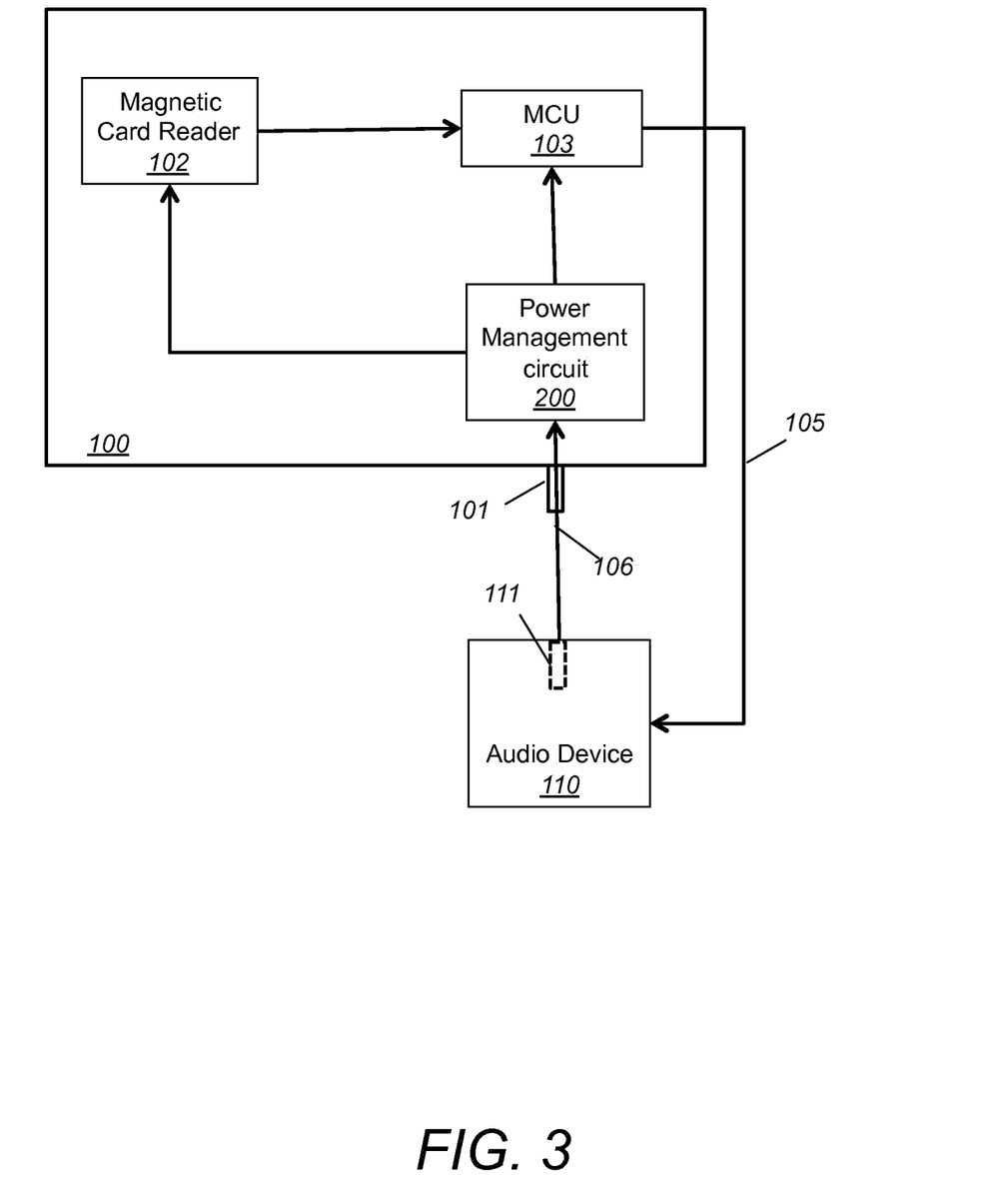
FIG. 3 is a block diagram of one embodiment of a peripheral device of FIG. 1.

The mobile audio device 110 may be a mobile phone, a personal digital assistant (PDA), netbook, tablet computer, notebook computer, game console, e-book reader, portable video player, digital audio player, among others. In one example, peripheral accessory 100 includes in addition to the audio jack connector 101 and the power management circuit 200, a magnetic card reader 102, and a microprocessor or micro controller unit (MCV), shown in FIG. 3

Figure 2:
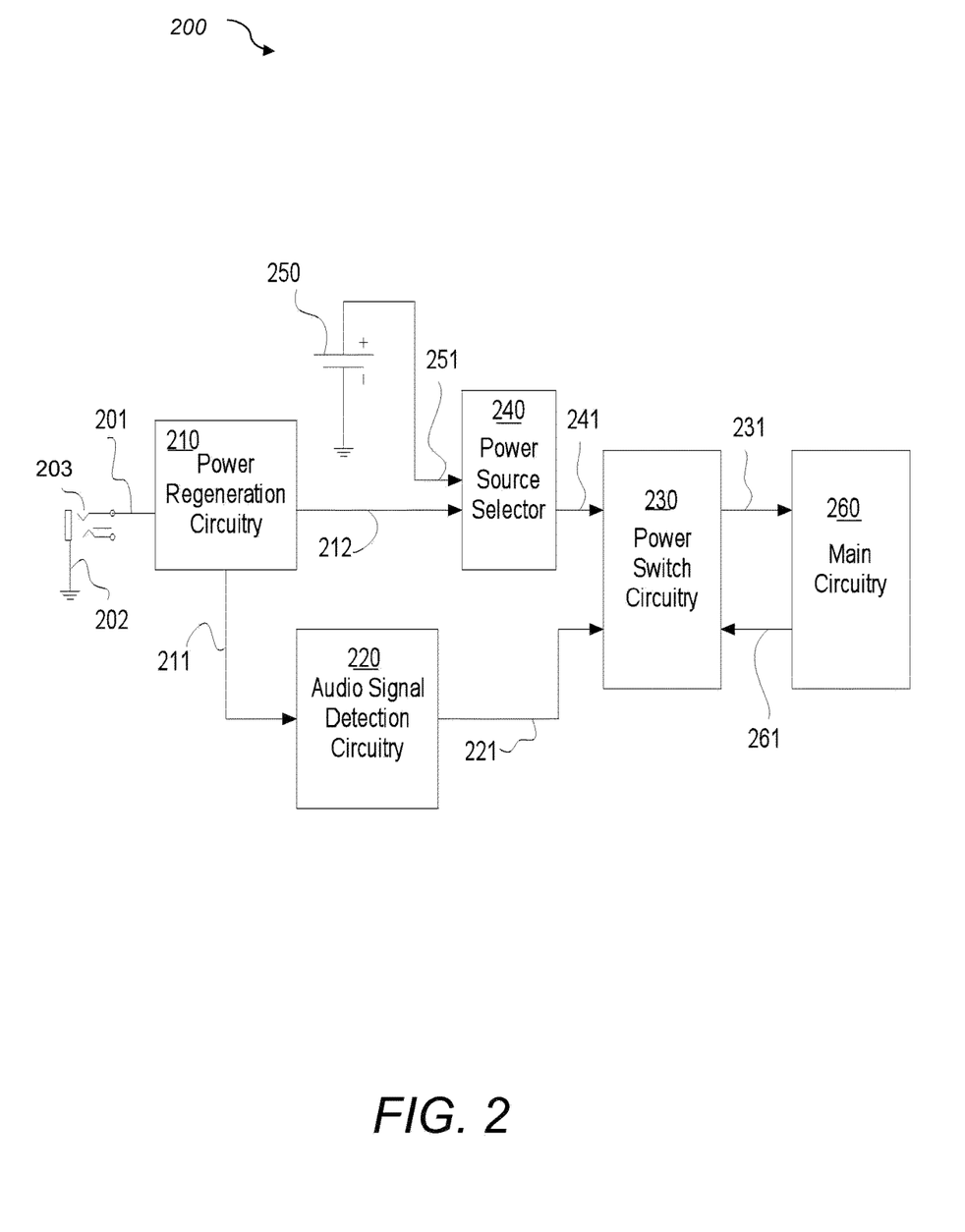
FIG. 2 is a block diagram of the circuitry of the peripheral device of FIG. 1.
Figure 7A:
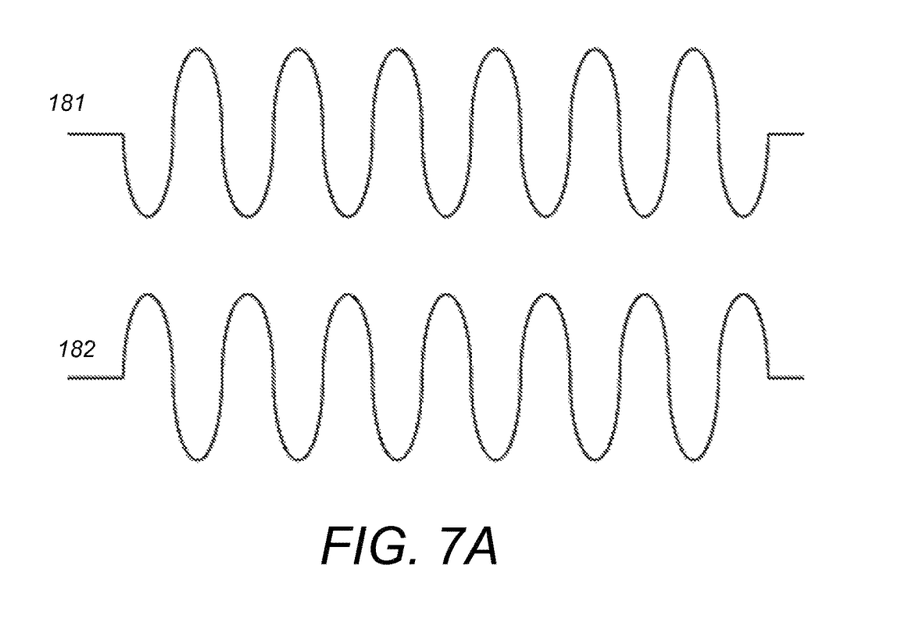
FIG. 7A depicts continuous sinusoidal out-of-phase sound waves played in the left and right channels of the audio device of FIG. 1.
Figure 7B:
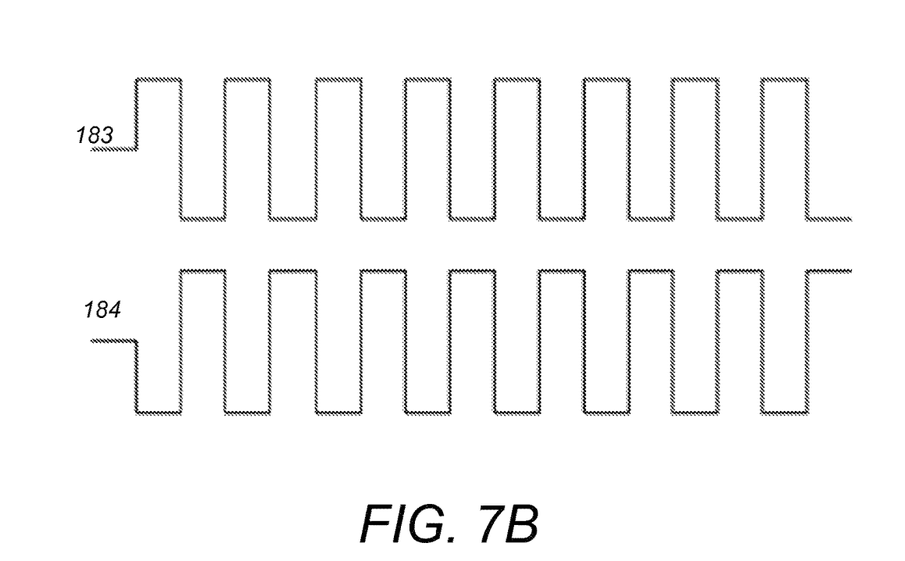
FIG. 7B depicts a continuous square out-of-phase sound wave played in the left and right channels of the audio device of FIG. 1.

Referring to FIG. 2, power management circuitry 200 includes a power regeneration circuitry 210, a power source selector 240, an audio signal detection circuitry 220, a power switch circuitry 230 and the main circuitry 260. Mobile audio device 110 is programmed to play a periodic sound wave continuously. Examples of the continuous period sound waves include continuous sinusoidal out-of-phase sound waves played in the left and right channels 181, 182 of the audio device 110, shown in FIG. 7A, continuous sinusoidal in-phase sound waves played in the left and right channels 185, 186 of the audio device 110, shown in FIG. 8A, continuous square out-of-phase sound waves played in the left and right channels 183, 184 of the audio device 110, shown in FIG. 7B, and continuous square in-phase sound waves played in the left and right channels 187, 188 of the audio device 110, shown in FIG. 8B.

When the peripheral accessory 100 is plugged into the audio device 110 and the audio device 110 generates and transmits an audio signal to the peripheral accessory 100 via the audio jack 101, the signal 201 from one of the contacts 203 is fed into the power regeneration circuitry 210. From the power regeneration circuitry 210 input side, the periodic sound wave signal 201 looks like an AC power signal with a very low voltage. The power regeneration circuitry 210 receives the audio signal 201 and generates a stable DC electrical signal 211 with an increased voltage. The generated DC electrical signal 211 is then fed into the audio signal detection circuitry 220. The power regeneration circuitry 210 also generates a regenerated power signal 212 which is fed into the input of the power selector 240. Power selector 240 also receives an input 251 from the internal battery 250.

The output 241 of the power selector 240 originates either from the internal battery 250 or is the power signal 212 that originates from the external source 110.

Figure 4:
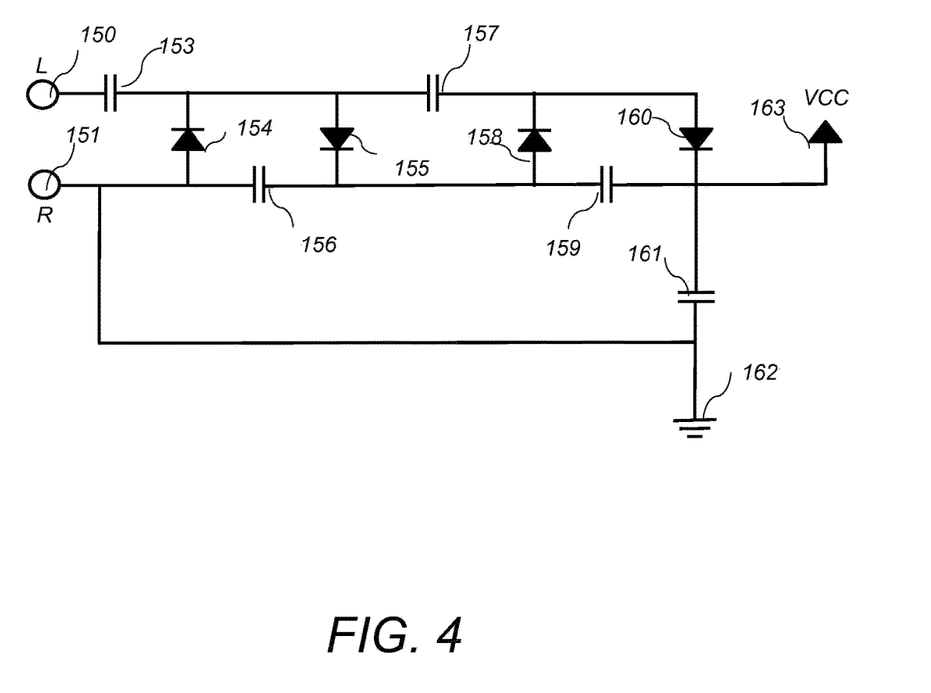
FIG. 4 is one embodiment of the power regeneration circuitry of FIG. 2.
Figure 5:
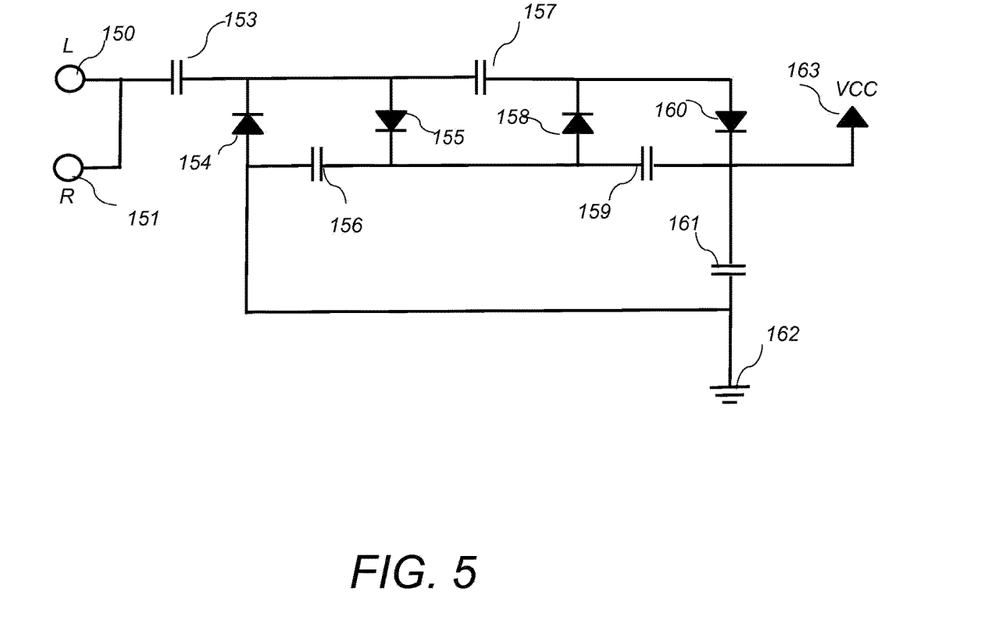
FIG. 5 is another embodiment of the power regeneration circuitry of FIG. 2.
Figure 8A:
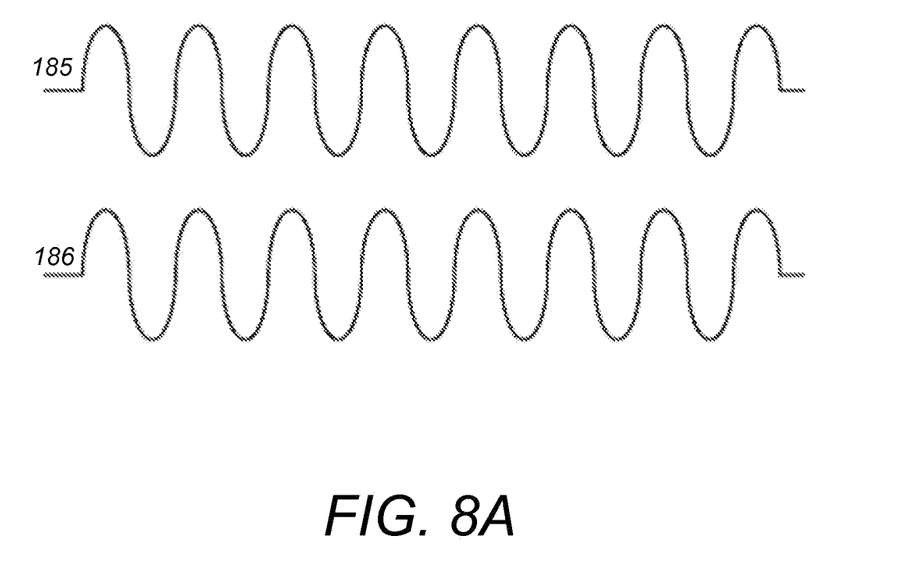
FIG. 8A depicts a continuous sinusoidal in-phase sound wave played in the left and right channels of the audio device of FIG. 1
Figure 8B:
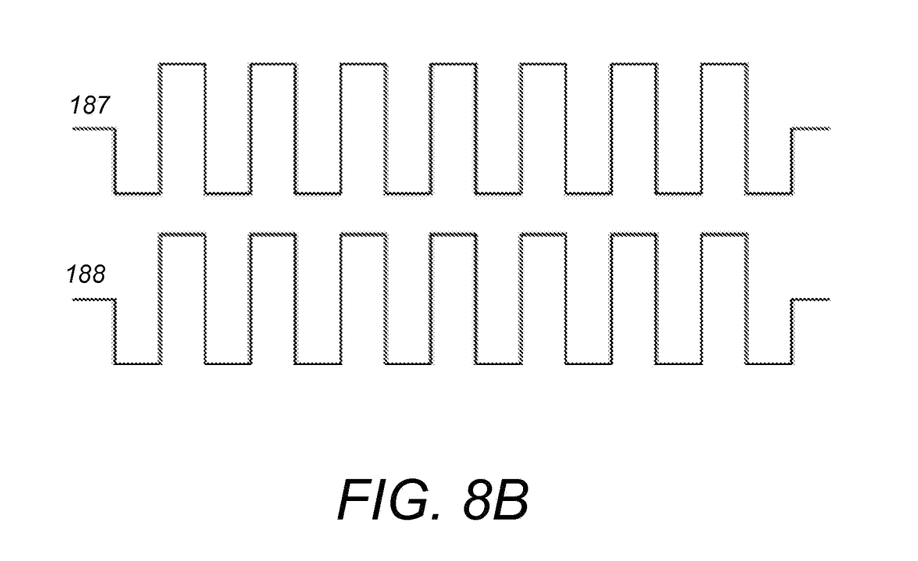
FIG. 8B depicts a continuous square in-phase sound wave played in the left and right channels of the audio device of FIG. 1.

The power regeneration circuitry 210 uses either a voltage multiplier or a transformer in order to increase the voltage of the input signal 201 and to generate a stable DC electrical signal 211. Referring to FIG. 4, in one embodiment, the power regeneration circuitry 210 receives inputs 150,151, from the left and right earphone channels 181, 182 of the audio device 110, respectively and generates a DC electrical signal (VCC output) 163. In one example, input signals 150, 151 are 5 kHz out-of-phase sine or square waves, shown in FIGS. 7A and 7B, respectively. The power regeneration circuitry 210 includes four small capacitors 153, 156, 157, 159, four diodes 154, 155, 158, 160 and one larger capacitor 161. In one example, small capacitors 153, 156, 157, 159 are 22 µF capacitors, diodes 154, 155, 158, 160 are low voltage Schottky diodes, and larger capacitor 161 is a 1000 µF capacitor. Diodes 154, 155 and capacitors 153, 156 form a voltage doubling circuit that converts the input signal 201 from AC to DC and doubles the input voltage. Diodes 158, 160 and capacitors 157, 159 form another voltage doubling circuit that further doubles the input voltage. After the two voltage doubling steps the output voltage is a DC voltage with a four times amplified amplitude. The larger capacitor 161, stabilizes the DC output signal and stores power. When the continuous sound wave is stopped, capacitor 161 provides power to the device in order to finish ongoing operations. In the embodiment of FIG. 5, the operation of the power regeneration circuitry 210 is the same as in the embodiment of FIG. 4, except that the input signals are in-phase continuous sine or square waves, as shown in FIG. 8A, and FIG. 8B.

Figure 6:
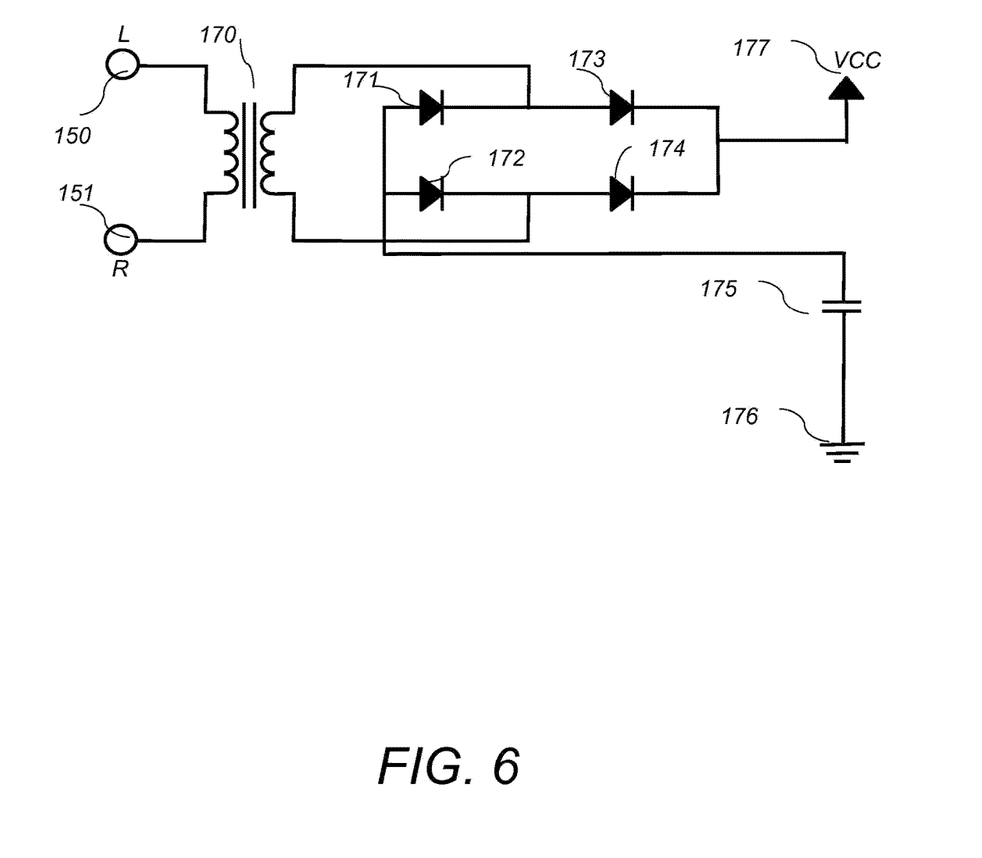
FIG. 6 is another embodiment of the power regeneration circuitry of FIG. 2.

Referring to FIG. 6, in another embodiment, the power regeneration circuitry 210 receives inputs 150, 151, from the left and right earphone channels 181, 182 of the audio device 110, respectively and generates a DC electrical signal (VCC output) 177. In one example, input signals 150, 151 are 5 kHz out-of-phase sine or square waves, shown in FIGS. 7A and 7B, respectively. The power regeneration circuitry 210 includes a transformer 170, four diodes 171, 172, 173, 174 and one large capacitor 175. In one example, transformer 170 has a primary winding impedance of 16 ohm at 5 kHz sine wave, diodes 154, 155, 158, 160 are low voltage Schottky diodes, and large capacitor 175 is a 1000 µF capacitor. The transformer amplifies the input AC voltage by 10 times and the four diodes 171,172,173,174 form a bridge circuit that converts the signal from AC to DC. The large capacitor 175, stabilizes the DC output signal and stores power. When the continuous sound wave is stopped, capacitor 175 provides power to the device in order to finish ongoing operations.

In other embodiments, the voltage multiplier is a 3-stage or more voltage doubler. In one example, the peak-to-peak AC voltage output from a weak audio device or phone 110 is 0.3 V and the operating voltage of the magnetic card reader 102 is 2.3V. In this case a 3-stage multiplier is used to multiply the AC input voltage by 8 times and thereby to increase the signal to 2.4V (0.3V times 8). In another example, the peak-to-peak AC voltage output from a strong audio device or phone 110 is 1 V and the operating voltage of the magnetic card reader 102 is 2.3V. In this case the 3-stage multiplier multiplies the AC input voltage by 8 times and generates a signal of 8V (1 V times 8). This voltage output is too strong and will destroy the magnetic card reader 102. Therefore, a Zener diode (not shown) is used to limit the output voltage to 2.4 V. In summary, the voltage regeneration circuitry 210 is a voltage multiplier or transformer that multiplies the AC input signal that originates from a continuous periodic sound wave emitted by the audio device 110. The voltage regeneration circuitry 210 also converts the AC signal into a DC signal and limits the voltage of the output signal to the operating voltage level of the peripheral accessory device.

As was mentioned above, audio signal 201 originating from the MIC-IN contact 203 is converted into a DC electrical signal 211 and the DC electrical signal 211 is used to switch on the power for the audio signal detection circuitry 220, which draws power from the internal battery 250. Once the audio detection circuitry 220 detects the presence of signal 211, it sends a signal 221 that turns on the power switch circuitry 230. Power switch circuitry 230, then transmits the power supply output of the power selector 240 to the main circuitry 260.

Several embodiments of the present invention have been described. Nevertheless, it will be understood that various modifications may be made without departing from the spirit and scope of the invention. Accordingly, other embodiments are within the scope of the following claims.

What is claimed is:

1. A power management circuitry used in a peripheral electronic device comprising:
    a power regeneration circuitry to receive a periodic sound wave from an audio device and to generate a first output and a second output, wherein said first output comprises a regenerated power signal, and said second output comprises an amplified DC electrical signal produced based on the periodic sound wave;
    a power source selector configured to:
        receive a first input including the first output generated by the power regeneration circuitry, and
        receive a second input from a primary power source, and
        provide a power signal output based on said first and second inputs;
    a power switch circuitry;
    an audio signal detection circuitry to receive the second output from the power regeneration circuitry and to transmit a wake-up signal to the power switch circuitry; and
    wherein the power switch circuitry is turned on by the wake-up signal and said power switch circuitry couples the power source selector to a main circuitry of the peripheral electronic device and thereby transfers the power signal output to the main circuitry of the peripheral electronic device.

2. The power management circuitry of claim 1, further comprising:
    an audio jack connector to couple the peripheral electronic device to the audio device; and
    said audio device comprises a secondary power source,
        further wherein the secondary power source comprises one of
            a battery,
            a capacitor,
            a solar cell,
            a circuitry that regenerates power from an audio signal,
            a thermoelectric generator,
            a piezoelectric element,
            a device that generates power from motion and vibration,
            a rechargeable power source, or
            a non-rechargeable power source.

3. The power management circuitry of claim 2, wherein said audio jack connector comprises
    a ground (GND) contact,
    a microphone-in (MIC-IN) contact, and
    one or more earphone channel contacts.

4. The power management circuitry of claim 3, wherein said audio jack comprises one of a
    4-contact Tip-Ring-Ring-Sleeve (TRRS) connector,
    3-contact Tip-Ring-Sleeve (TRS) connector,
    a 3.5 mm audio jack,
    a 6.35 mm audio jack,
    a 2.5 mm audio jack, RCA connector,
    XLR connector,
    a banana connector, and
    mono or stereo versions thereof.

5. The power management circuitry of claim 3, wherein said audio device comprises an audio plug to receive said audio jack connector and wherein said audio plug comprises
    a ground (GND) contact to connect to said audio jack GND contact,
    a microphone-in (MIC-IN) contact to connect to said audio jack MIC-IN contact, and
    one or more earphone channel contacts to connect to said audio jack one or more earphone channel contacts.

6. The power management circuitry of claim 2, wherein said primary power source is recharged by said secondary power source via said power regeneration circuitry.

7. The power management circuitry of claim 1, wherein said peripheral electronic device comprises one of a payment card reader, magnetic card reader, a printer, headphones, speakers, microphones, or hands-free versions thereof.

8. The power management circuitry of claim 1, wherein said audio device comprises one of a mobile phone, a personal digital assistant (PDA), netbook, tablet computer, notebook computer, game console, e-book reader, portable video player, or digital audio player.

9. A method for providing power management in a peripheral electronic device comprising:
    receiving, using a power regeneration circuitry, a periodic sound wave from an audio device;
    producing, based on the received periodic sound wave and using the power regeneration circuitry,
        a regenerated power signal, and
        an amplified DC electrical signal;
    receiving, using a power source selector, a first input comprising the regenerated power signal from the power regeneration circuitry and a second input from a primary power source, said inputs used to provide a power signal output from said power source selector;
    providing a power switch circuitry;
    receiving, using an audio signal detection circuitry, the amplified DC electrical signal from the power regeneration circuitry;
    transmitting, using the audio signal detection circuitry, a wake-up signal to the power switch circuitry; and
    wherein the power switch circuitry is turned on by the transmitted wake-up signal and couples the power source selector to the peripheral electronic device main circuitry and thereby transfers the power signal output to the peripheral electronic device main circuitry.

10. The method of claim 9 wherein said power regeneration circuitry comprises at least one of
    a voltage multiplier;
    a transformer; and
    a voltage stabilizer.

11. The method of claim 9, wherein said periodic sound wave comprises one of
- a sinusoidal in-phase sound waves played in left and right channels of the audio device,
- a sinusoidal out-of-phase sound waves played in left and right channels of the audio device,
- a square in-phase sound waves played in left and right channels of the audio device, or
- a square out-of-phase sound waves played in left and right channels of the audio device.

12. The method of claim 9, wherein said peripheral electronic device comprises one of a payment card reader, magnetic card reader, a printer, headphones, speakers, microphones, or hands-free versions thereof.

13. The method of claim 9, further comprising:
providing an audio jack connector to connect the peripheral electronic device to the audio device.

14. The method of claim 9, further wherein said audio device comprises a secondary power source, and the method further comprising:
recharging said primary power source by said secondary power source via said power regeneration circuitry.

15. A power management circuitry used in a peripheral electronic device comprising:
- a power regeneration circuitry to receive a periodic sound wave from an audio device, and produce an amplified DC electrical signal and a regenerated power signal based on the received periodic sound wave;
- a power switch circuitry;
- an audio signal detection circuitry to receive the amplified DC electrical signal from the power regeneration circuitry and to transmit a wake-up signal to the power switch circuitry; and
- wherein the power switch circuitry is turned on by the wake-up signal and said power switch circuitry couples the power regeneration circuitry to the peripheral electronic device main circuitry and thereby transfers the regenerated power signal to the peripheral electronic device main circuitry.

16. The power management circuitry of claim 15, wherein said audio device comprises one of a mobile phone, a personal digital assistant (PDA), netbook, tablet computer, notebook computer, game console, e-book reader, portable video player, or digital audio player.

17. The power management circuitry of claim 15, further comprising an audio jack connector to connect the peripheral electronic device to the audio device.

18. The power management circuitry of claim 15, further wherein said periodic sound wave comprises one of
- a sinusoidal in-phase sound waves played in left and right channels of the audio device,
- a sinusoidal out-of-phase sound waves played in left and right channels of the audio device,
- a square in-phase sound waves played in left and right channels of the audio device, or
- a square out-of-phase sound waves played in left and right channels of the audio device.

19. The power management circuitry of claim 15, wherein said power switch circuitry is coupled to said power regeneration circuitry via a power source selector, and
wherein said regenerated power signal is transferred via said power source selector.

20. The power management circuity of claim 15, wherein the audio device comprises a secondary power source,
the power source selector is powered by a primary source, and
the primary source is recharged by said secondary power source via said power regeneration circuitry.

* * * * *